May 13, 1952  H. A. SHABAKER  2,596,610
APPARATUS FOR CONTACTING SOLID MATERIALS WITH FLUIDS
Filed March 17, 1948
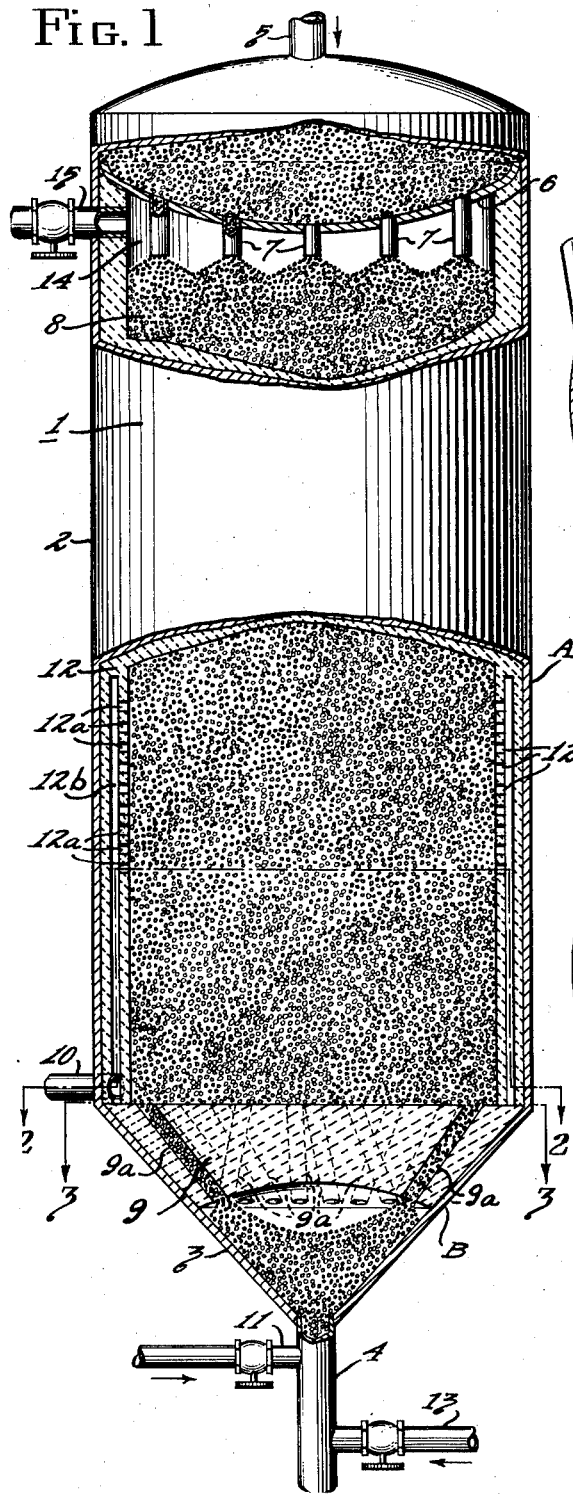
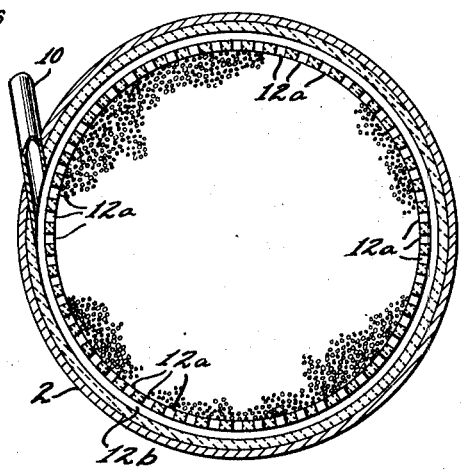
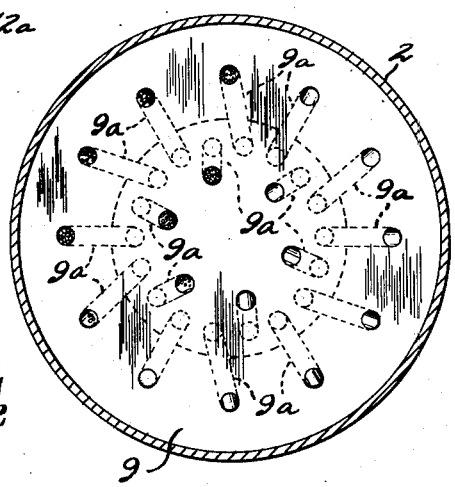
INVENTOR
HUBERT A. SHABAKER
BY
Gordon A. Kessler
ATTORNEY Patented May 13, 1952

2,596,610

UNITED STATES PATENT OFFICE 2,596,610

APPARATUS FOR CONTACTING SOLID MATERIALS WITH FLUIDS

Hubert A. Shabaker, Media, Pa., assignor to Houdry Process Corporation, Wilmington, Del., a corporation of Delaware Application March 17, 1948, Serial No. 15,336

7 Claims. (Cl. 23—284)

The present invention relates generally to apparatus for use in contacting particulate solid materials with fluids in continuous processes. It is particularly concerned with apparatus for conducting such operations at elevated temperatures in systems wherein provision is made for heat exchange between said solid materials and said fluids.

An important use of the apparatus of the invention is in carrying out chemical reactions at elevated temperature wherein particulate solid material is heated to desired reaction temperature in contact with hot gases and a thus heated material subsequently treated with a chemically reactive gas to effect chemical modification of the solid material or a component thereof. The apparatus finds particular use in the treatment of materials with gases having a corrosive effect on metals; one illustration of such treatment being sulfidation of clays at elevated temperature as described in my copending applications Serial Nos. 6683 and 6722 filed February 6, 1948, of which this application is a continuation-in-part.

Other advantageous uses of the novel apparatus hereinafter described will be apparent from the description which follows read in connection with the accompanying drawings; wherein:

Figure 1 is a front elevation largely diagrammatic of a treating apparatus, parts being broken away and appear in section to show portions of the interior;

Figure 2 is a horizontal cross-section taken along the line 2—2 of Figure 1;

Figure 3 is a horizontal cross-section taken along the line 3—3 of Figure 1.

The invention is not limited in its application to the treatment of any particular solid materials nor to any particular chemical reactions to be effected. By way of illustration and not in a limiting sense, the description which follows will be chiefly directed to one application of the invention, sulfidation of iron-containing clays and similar mineral materials, as more fully set out in my copending application Serial No. 6,722, filed February 6, 1948.

Referring now particularly to the drawings, there is shown the treating apparatus comprising the reactor 1, which through the major part of its length is bounded by a substantially vertical cylindrical wall 2 and at its lower part comprises a section of smaller length and reduced diameter shown as an inverted conical section 3, terminating in a discharge conduit 4.

The solid material is introduced through a charge conduit 5, provided with known suitable means such as a seal gas, valve or the like (not shown) to prevent or retard escape of gases from the reactor through this conduit.

Solid materials charged to the reactor are collected on a concave plate member or hopper 6 and distributed over the cross-section of the reactor proper by means of spaced down-comers 7 to form a substantially uniform moving bed of particulate solid material in granular form of any desired size as at 8. This bed gravitates through the apparatus, entering the section 3 through distributing channels 9a, formed in the separating block 9 and arranged to obtain substantially uniform withdrawal of the catalyst and to redistribute the same over a narrower cross sectional area in the section 3 for ultimate discharge through conduit 4.

The preferred arrangement of the distributing channels 9a in this embodiment is better shown in Figure 3, taken in connection with Figure 1. It will be seen that the outer series of channels are directed downwardly and inwardly and the inner series of channels are directed outwardly and downwardly, the two series forming concentric circles at their inlets and their termini forming a single circle. By this arrangement the tendency to differences in velocity of movement between granules adjacent the wall and that closer to the center is largely overcome and substantial uniformity of withdrawal of such granules from the wider bed above line 3—3 of Figure 1 is achieved.

It will be understood that although the reactor 1 in the preferred embodiment illustrated is cylindrical in form at its upper section and the lower section is conical, other geometric configurations are within the scope of the invention. In adopting other shapes of apparatus the several groups of channels 9a need not necessarily be arranged in series of concentric circles but may be in other shapes conforming to the outline of the lateral wall of the reactor such that the outer series of channels have their inlets spaced approximately equally from said wall and the inner series of channels also are also approximately uniformly spaced from said wall. It is preferred, however, regardless of the shape of the reactor that the outlets of the channels be arranged in a common circle, since in this manner uniformity of feed is best obtained. Other arrangements, however, are possible with greater or less sacrifice of the advantages of the circular arrangement.

Instead of only two concentric series formed by the channels at their inlets, three or more of such concentric series may be employed, if desired, particularly in reactors of large diameter. In such arrangement the number of channels in each series will be reduced respectively as the particular series is located further inward from the wall.

Means are provided, as by a conduit shown at 10, for the introduction of heating and diluent gas into the reactor; channelling being minimized by the use of an inner wall, as shown at 12, provided with a circumferential channel or slot 12b and over part of its longitudinal extent with perforations 12a or an equivalent vertically or horizontally slotted or reticulated arrangement. Reactive gas may be introduced into the conduit 4 by means such as line 11. Seal gas is also introduced into the conduit 4 below the line 11, as shown at 13; a portion of the gas thus introduced through line 13 passing upwardly, preventing downward flow of gas introduced through line 11, and causing that gas to pass upwardly into the funneled section 3 of the reactor and through the channels 9a into the wider section thereabove; such flow of gas being counter to the gravitation of the solid materials. In the upper section of the reactor adjacent the perforated inner wall 12 the ascending gases become admixed with the hot gas there introduced, causing a generally upward flow of the hot mixed gases counter to the moving bed of solids. The ascending gases are disengaged from the solid materials in the vapor space provided above the bed as at 14 and are discharged through the conduit 15. The tangential arrangement of the conduit 10 tends to impart a swirling action to the gas introduced in the channel or slot 12b, which assures good distribution of the gas in the channel for uniform entry throughout the circumference of the reactor through the openings in wall 12.

The perforated inner wall 12 as well as the block 9 are advantageously formed of ceramic or other refractory or heat resistant materials, which materials are also resistant to corrosion by hot reactive gases which attack metal. The use of the corrosion resistant block and inner wall is particularly important in connection with the suggested use of the described treater for sulfidation of clays and like minerals. By the arrangement shown furthermore, the hot gas in the circumferential channel 12b serves to maintain the solid materials being heated at their attained temperature without heat loss through the wall.

The operation of the system thus far described will be illustrated as applied to sulfidation of an iron-containing clay. The clay in granular form of any convenient size is introduced into the reactor as described to form a solid moving bed, which in gravitation through the apparatus to discharge through the conduit 4, will pass through a zone A where it will be heated to required reaction temperature by contact with hot gases therein. The gases in zone A will be composed of a dilute mixture of sulfiding gas such as hydrogen sulfide or carbon disulfide in an essentially inert diluent or carrier gas such as nitrogen or flue gas. This gaseous mixture is formed from the large volume of essentially inert gas introduced through line 10, the concentrated reactive sulfide gas introduced through line 11, and the seal gas (which may be of the same or different composition as the previously mentioned essentially inert gas) introduced through line 13. Only a small quantity of gas need be introduced through line 11, but the inlet pressure of this gas and that introduced through line 13 should be maintained above that of the gas in the main portion of the reactor, to effect required upward flow. The active sulfiding gas is diluted to controlled concentration by the upwardly flowing portion of the seal gas entering through line 13.

As a specific illustration of a practical operation, the clay is introduced in unheated form as is the seal gas through line 13 and the active sulfiding gas through line 11. The essentially inert diluent gas is introduced through line 10 at about 1400° F. and becoming admixed with the considerably smaller volume of gases entering through the passages 9a is only slightly reduced in temperature. By contact with the thus diluted sulfiding gas the clay is heated to desired reaction temperature in the preferred range of 1350–1400° F. The volumetric ratios of the gases are adjusted so that the composition of hot dilute sulfiding gas in the main portion of the reactor is maintained so that the sulfide content is at about 2 to 4 times the stochiometric equivalent of the iron content of the clay; this quantity of active sulfide gas in sufficient inert gas to effect heating of the clay to desired temperature is readily obtained in a reactor of the design illustrated when the active sulfide gas constitutes from about 0.75 to about 1.5% of the total hot dilute gas composition. The concentrated sulfide gas introduced through line 11 may be up to 100% active sulfide gas, as $H_2S$ or $CS_2$, and will be diluted to 15 to 75% by volume in the concentrated treating section B, preferably to 25 to 50%. To assure the initiation of sulfiding reaction uniformly over the cross-section of the main portion of the reactor, a desired portion of active sulfide gas may be and preferably is admixed with hot essentially inert carrier gas and the admixture thus constitutes the hot diluent gas introduced through line 10. In practice the diluent gas so introduced will contain 0.5% or more by volume of active sulfide and generally not in excess of about 3 to 5%.

The wall of the conical section of the reactor below the block 9 may be formed of metal and left free from insulation or refractory lining. In this manner, the outside of the metallic wall being exposed to the atmosphere, cooling of the hot clay will be begun. Further cooling of the treated clay may be accomplished while in transit by the provision of suitable cooling coils below line 13 in the conduit 4.

The cooled clay after sulfidation is subjected to leaching with dilute acid, as described in U. S. Patent No. 2,466,048 of April 5, 1949, issued on copending application Serial No. 644,423. For instance the sulfided clay may be treated with dilute aqueous mineral acid at room temperature for 3 to 24 hours, then dried.

In addition to the illustrated principal use of the system described in sulfidation of clay, the same finds use in related processes such as treatment of clay with chlorine gas and generally in other processes wherein solid materials are to be treated with hot reactive gases as a continuous operation. One such use is in connection with regenerating coked catalyst from a hydrocarbon conversion operation. In this operation the catalyst gravitates counter-current to the regenerating gas and would be initially contacted with diluted oxidizing gas to burn off the major portion (or any desired portion) of the carbonaceous deposit in zone A; the thus partly regenerated catalyst containing now a smaller portion of unburned coke would then be brought into contact for a short time with concentrated oxidizing gas (higher oxygen content) in the lowermost level of the treater in zone B. The unconsumed oxygen from such lower section will enter the initial treating section A and be diluted by the flue gas or other diluent gas introduced directly into such section.

The system described is of particular advantage in a catalytic hydrocarbon conversion system wherein the hydrocarbon conversion reactions are carried out at temperatures below that required for burning of the coke formed, in the subsequent regeneration step. Thus, in catalytic polymerization of low molecular weight hydrocarbons, the coked catalyst may enter the regenerating kiln at temperatures of about 600° F. or below. Inert gas such as a flue gas or gas of low oxygen content is directly admitted to the zone A and will heat the catalyst to combustion temperature of the coke. A gas rich in oxygen is admitted to zone B and is only partly consumed in burning of residual coke on the hot catalyst entering that zone from A, the resulting effluent gas from B containing unconsumed oxygen, then passes upwardly into zone A and is diluted by the inert or oxygen-poor gas directly introduced in that zone, to form the dilute regenerating gas acting in that zone. By operating in this manner, the catalyst of highest coke content is treated with diluted regenerating gas of low oxygen content, and the final regeneration by burning of the remaining small amount of residual coke on the catalyst is assured by the short contact with oxygen-rich gas in zone B. This permits very effective utilization of the quantity of oxygen employed. If desired, the rate of flow of the concentrated treating gas and seal gas in zone B may be such, as to at least in part, effect cooling of the catalyst to required temperature for the on-stream hydrocarbon conversion reaction.

By use of the system described, good distribution of reactive gases and uniformity of chemical treatment is assured. By bringing in the concentrated reactive gas in the relatively narrow zone in the final "scavenging" treatment, completion of the reaction is brought about in a short contacting periods at low bulk volume and with minimum waste of reactive gas. Deleterious by-products are rapidly flushed from the system as formed in the region of lowest temperature by the large volumes of gas present in the initial zone of treatment, without permitting the same to further contact the material being treated at the higher temperatures attained. Irregularities in the first treating stage resulting from channelling of gas or imperfect mixing therein are taken care of in the concentrated treating stage, permitting the use of very dilute mixtures during the heating-up period with resulting economies.

Obviously many modifications and variations of the invention as hereinbefore set forth may be made without departing from the spirit and scope thereof and therefore only such limitations should be imposed as are indicated in the appended claims.

I claim as my invention:

1. Apparatus for contacting freely flowable solid materials with gaseous fluids comprising an upright treating chamber having a vertical wall laterally enclosing said chamber, a top closure for said chamber open to the introduction of solid materials therethrough and into said chamber for gravitation of said solid materials through said chamber, a bottom member in said chamber, the upper surface of which forms a temporary support for a bed of solid materials in said chamber, said bottom member having a plurality of downwardly directed conduits associated therewith through which solid materials can be withdrawn from above the surface of said bottom member, said conduits being positioned so that their inlet openings are at the upper surface of said bottom member and are arranged in a plurality of horizontally concentric circles including an outer circle and an inner circle, the conduits extending from said outer circle being directed downwardly and inwardly and the conduits extending from said inner circle being directed downwardly and outwardly so that the outlet openings of said conduits from both said outer and inner circles are arranged to form a common circle in a horizontal plane below said bottom member, whereby withdrawal of solid material from above the surface of said bottom member is effected with substantial uniformity over the entire lateral cross section of said chamber; fluid conducting means for introducing gaseous fluids from an external source into said chamber and separate fluid conducting means for withdrawing gaseous fluids from said chamber, said several fluid conducting means communicating with said chamber at points vertically spaced from said bottom member, one of said fluid conducting means communicating with said chamber at a location above said bottom member and the other of said fluid conducting means communicating with said chamber at a location below said bottom member.

2. Apparatus for contacting solid particulate materials with gaseous fluids comprising an upright treating chamber, having a lateral wall delineating the lateral periphery of said chamber, said wall being inwardly flared at a lower portion thereof forming a funnel shaped lower section of said chamber, feeding means for introducing solid particulate materials into said chamber for gravitation therethrough, a frustro-conical lateral partition within said chamber arranged below said feeding means, said partition having an upper surface constituting a temporary support for solid materials gravitating through said chamber and said partition having a lateral wall nested in said funnel-shaped lower section of said chamber, means associated with said partition for conducting solid materials from the surface thereof to the funnel shaped lower section of said chamber, said means comprising a plurality of conduits having inlets at the upper surface of said partition and outlets within said funnel shaped lower section, said outlets terminating at a level spaced above the bottom of said funnel-shaped lower section, the conduits being so positioned that they form at their inlets several series comprising an outer series uniformly spaced inwardly from the lateral wall of the treating chamber and an inner series spaced from and concentric with said outer series, said conduits being directed downwardly from their inlets to converge so that the outlets thereof are arranged in a common single series uniformly spaced from the inwardly flared wall of said reactor, whereby substantially uniform withdrawal of solid material from above said partition is obtained; means for introducing gas located below said partition and means for discharging gas from said reactor above said partition, whereby introduced gas is caused to flow upwardly to discharge by passing through said funnel-shaped lower section and through said conduits in countercurrent relation to gravitating solid materials.

3. Apparatus as defined in claim 2 wherein means for the introduction of seal gas are provided below said recited means for introducing gas, whereby by suitable control of pressure differential upward flow of gas is effected.

4. Apparatus as defined in claim 2 including further means for directly introducing gas from an external source above said partition.

5. Apparatus for treating solid granular materials with gases comprising a reactor, feeding means for introducing said solid granular materials into said reactor for gravitation therethrough, said reactor comprising an upper section of substantially uniform transverse cross-section and a lower section of reduced transverse cross-section terminating in a solids discharge conduit of narrow transverse cross-section, a distributing member nested in said lower section dividing said upper section of said reactor from said lower section, said distributing member being formed as an integral frusto-conical block of insulating and corrosion-resistant materials and being provided therein with passages for flow of said granular material being treated from said upper section to said lower section, said passages being arranged in said distributing member so that the inlets thereof form a horizontally spaced series of concentric circles, the outermost series of passages being directed downwardly and inwardly and the innermost series of passages being directed downwardly and outwardly so that the discharge outlets of said outermost and of said innermost series of passages form a single common circle in a horizontal plane, whereby there is obtained uniform withdrawal of solid materials being treated from the upper section of said reactor; means for introducing gas from an external source into said upper section, a plurality of separate pipes being arranged to introduce gases into said solids discharge conduit, said pipes individually communicating with said conduit at spaced points along the length of said conduit, and means for removing gases at an uppermost point of said upper section of the reactor; the lateral wall surrounding said upper section being provided on the inside of said reactor with an insulating and corrosion-resistant lining and said lower section of said reactor below said distributing member being bounded by a lateral wall free from lining, thereby permitting heat exchange between the contents of the reactor and the atmosphere at the unlined wall of said lower section.

6. Apparatus in accordance with claim 5 wherein said lining on the lateral wall surrounding the upper section of the reactor as defined, is provided with an annular channel therein along a portion of its length and said means for introducing gas from an external source into said upper section is in communication with said channel, whereby the gas thus introduced operates to further prevent heat exchange between the contents of the reactor in said upper section and the external wall of said reactor.

7. Apparatus in accordance with claim 6 wherein said lining along at least a portion of the longitudinal extent of said channel therein is provided with openings communicating with the inside of said reactor, through which gas introduced into said channel is admitted into said reactor.

HUBERT A. SHABAKER.

REFERENCES CITED

The following references are of record in the file of this patent:

UNITED STATES PATENTS

| Number | Name | Date |
| --- | --- | --- |
| 8,079 | Schroeder | May 6, 1851 |
| 2,412,135 | Evans | Dec. 3, 1946 |
| 2,412,136 | Evans et al. | Dec. 3, 1946 |